UNITED STATES PATENT OFFICE.

CHARLES M. HALL, OF NIAGARA FALLS, NEW YORK.

PROCESS OF PURIFYING BAUXITE, &c.

SPECIFICATION forming part of Letters Patent No. 677,208, dated June 25, 1901.

Application filed February 2, 1901. Serial No. 45,731. (No specimens.)

*To all whom it may concern:*

Be it known that I, CHARLES M. HALL, of Niagara Falls, in the county of Niagara and State of New York, have invented a new and useful Process of Purifying Bauxite and other Impure Aluminium Oxids, of which the following is a full, clear, and exact description.

I have discovered that bauxite or other impure oxid of aluminium can be freed from the silica, iron oxid, and titanic acid with which it is ordinarily contaminated by mixing with it aluminium either in its unalloyed state or preferably in the form of a powdered ferroaluminium alloy and subjecting it to heat sufficient to cause the mass to fuse. The aluminium acts as a reducing agent upon the impurities above mentioned and reduces them to their elemental form, when they combine as a melted alloy, easily separable from the alumina of the bauxite.

To illustrate my process in the case in which unalloyed aluminium is used as a reducing agent and in which the bauxite contains sufficient iron to constitute with the impurities a heavy and easily-separable alloy, I take thoroughly-calcined bauxite of, for example, the following composition: silica, 1.3 per cent.; titanic acid, 3.1 per cent.; ferric oxid, 22.7 per cent.; alumina, 72.9 per cent. I mix with the bauxite finely-divided aluminium (or an alloy of aluminium with iron may be used) in such proportions as to supply enough aluminium to combine chemically with the oxygen of the silica, iron oxid, titanic acid, and other reducible impurities in the bauxite and preferably somewhat in excess of that proportion. With bauxite of the composition above described I prefer to mix aluminium or an aluminium alloy containing aluminium sufficient to equal thirty-seven and one-half per cent. of the weight of the ferric oxid, sixty-five per cent. of the weight of the silica, and fifty per cent. of the weight of the titanic acid in the bauxite. I place this mixture of aluminium and bauxite in a furnace, preferably a carbon-lined electric furnace, and heat it until the mass is fused, and I keep the mass in fusion for a considerable time— for example, from one hour to one and one-half hours in treating, say, three hundred pounds of bauxite. The aluminium of the mixture combines chemically with the oxygen of the silica and other impurities, as manganese oxid or iron oxid, titanic acid, and the vanadium oxid present in some bauxites, reducing them and causing them to combine as a molten alloy, which generally sinks to the bottom of the mass, but may collect in globules or buttons. Considerable heat is evolved by this reaction, which aids in fusing the mass and in keeping it in fusion and constitutes an element of economy in the working of my process. In practice I have used a current of about sixty volts, with volume sufficient to give one hundred and fifty to two hundred horse-power, and have heated the material by an arc maintained in the midst of the mass, the carbon-lined furnace forming one electrode at the start of the operation and a carbon-rod or bunch of carbon-rods forming another electrode. This electrode is gradually raised in order to keep it above the surface of the fused portion of the mass, and as the mixture fuses and settles down more of it may be added until the furnace-cavity is nearly full, whereupon purified alumina may be thrown on top of the mass to cover it while the last of the material to be purified is being fused. At the end of the operation I may allow the mass to solidify in the furnace, then remove it and detach the metallic alloy containing the reduced impurities from the bottom of the mass of purified alumina, after which the alumina may be pulverized for use in the electrolytic process of making aluminium or otherwise used in the arts, or the fused alumina and reduced and alloyed impurities may be removed from the furnace by tapping.

Instead of using an arc the mixture may be fused by incandescent action of the current. I do not limit my invention to its practice with an electric furnace, as any form of furnace which will heat the material to the required temperature may be employed, the reaction itself evolving a large amount of heat. Where an incandescent furnace with a direct current is used, electrolysis will aid in the reduction.

Where the bauxite is low in iron, it is desirable to incorporate iron in the fused mass for the purpose of alloying with the reduced impurities, and I prefer in such case to employ as the reducing agent aluminium in alloy with a considerable proportion of iron. The following example will illustrate my process in such case: I take calcined white bauxite of, say, the following composition: silica, 4.3 per cent.; titanic acid, 3.6 per cent.; ferric oxid, 1.57 per cent.; alumina, 88.53 per cent. The bauxite is mixed with powdered aluminium-iron alloy containing, preferably, fifty per cent. of aluminium in such amount that the contained aluminium shall equal 5.8 per cent. of the bauxite. The mass is fused and the operation proceeded with, as above described.

My invention affords important advantages. By using aluminium I avoid the violent evolution of gas which takes place when carbon alone is used as a reducing agent, and the combination of the aluminium with the oxygen of the impurities produces alumina, which remains in the furnace and forms part of the purified product. The prevention of gas is important, since it causes the operation to proceed quietly and without wasteful ebullition. The use of aluminium in the form of an aluminium-iron alloy is of advantage not only because such alloy is readily comminuted, and therefore is easy to mix with the bauxite, but also because the iron alloys with the reduced impurities and causes them to separate thoroughly. In some cases, as where there is a considerable amount of iron in the bauxite, I may add carbon to assist in the reduction of the impurities.

I claim—

1. The method herein described of purifying bauxite or other impure oxid of aluminium, which consists in subjecting the oxid when fused to the reducing action of aluminium, causing the aluminium thereby to act as a reducing agent upon the impurities; substantially as described.

2. The method herein described of purifying bauxite or other impure oxid of aluminium, which consists in mixing finely-comminuted aluminium with the oxid and fusing the oxid, causing the aluminium thereby to act as a reducing agent upon the impurities; substantially as described.

3. The method herein described of purifying bauxite or other impure oxid of aluminium, which consists in incorporating a comminuted alloy of aluminium and a heavy metal with the oxid and fusing the oxid, thereby causing the aluminium to act as a reducing agent upon the impurities, and the reduced impurities to alloy with the heavy metal; substantially as described.

In testimony whereof I have hereunto set my hand.

CHARLES M. HALL.

Witnesses:
F. A. STOUGHTON,
K. M. FLAHERTY.